US010430284B2

(12) United States Patent
Jain et al.

(10) Patent No.: US 10,430,284 B2
(45) Date of Patent: Oct. 1, 2019

(54) CREATING A FULL BACKUP IMAGE FROM INCREMENTAL BACKUPS

(71) Applicant: International Business Machines Corporation, Armonk, NY (US)

(72) Inventors: Abhishek Jain, Baraut (IN); Shrikant V. Karve, Pune (IN); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 15/176,201

(22) Filed: Jun. 8, 2016

(65) Prior Publication Data
US 2017/0357550 A1    Dec. 14, 2017

(51) Int. Cl.
*G06F 11/14* (2006.01)

(52) U.S. Cl.
CPC ................. *G06F 11/1451* (2013.01)

(58) Field of Classification Search
None
See application file for complete search history.

(56) References Cited

U.S. PATENT DOCUMENTS

| 9,128,943 | B1 | 9/2015 | Khanduja et al. | |
|---|---|---|---|---|
| 2007/0266037 | A1* | 11/2007 | Terry | G06F 3/0607 |
| 2011/0289106 | A1* | 11/2011 | Rankin, Jr. | G06Q 10/10 707/769 |
| 2012/0197887 | A1* | 8/2012 | Anderson | H03M 7/30 707/736 |
| 2012/0218150 | A1* | 8/2012 | Oyabu | G06Q 10/00 342/451 |
| 2012/0331242 | A1* | 12/2012 | Shaikh | G06F 12/0261 711/154 |
| 2014/0075095 | A1* | 3/2014 | Manohar | G06F 12/0246 711/103 |
| 2014/0164730 | A1* | 6/2014 | Gold | G06F 3/0608 711/171 |
| 2014/0337294 | A1 | 11/2014 | Karonde et al. | |

(Continued)

OTHER PUBLICATIONS

Mell et al., "The NIST Definition of Cloud Computing", Recommendations of the National Institute of Standards and Technology, U.S. Department of Commerce, Special Publication 800-145, Sep. 2011, 7 pages.

*Primary Examiner* — Wilson Lee
(74) *Attorney, Agent, or Firm* — Nathan M. Rau

(57) ABSTRACT

A full backup copy of a storage volume can be created from only incremental backups of the storage volume. A bitmap can be created that includes a set of depopulated indicator locations configured to contain a set of indicators, where each indicator location represents a corresponding portion of the storage volume. Portions of the storage volume from which data was copied to a set of incremental backups can be identified. Indicators providing correspondence between the identified portions of the storage volume and the incremental backups of the set of incremental backups can be created in the bitmap, until the set of indicator locations in the bitmap is fully populated. In accordance with the set of indicators, data from the set of incremental backups corresponding to the identified portions of the storage volume can be copied to the backup copy.

16 Claims, 5 Drawing Sheets

(56) References Cited

U.S. PATENT DOCUMENTS

| | | | |
|---|---|---|---|
| 2015/0234712 A1* | 8/2015 | Fei | G06F 16/137 |
| | | | 707/639 |
| 2016/0070652 A1* | 3/2016 | Sundararaman | G06F 3/0619 |
| | | | 711/154 |
| 2016/0072805 A1* | 3/2016 | Freudiger | H04L 63/0876 |
| | | | 713/159 |
| 2016/0316723 A1* | 11/2016 | Wall | A01K 29/005 |
| 2017/0132721 A1* | 5/2017 | Riley | G09C 1/00 |
| 2017/0192851 A1* | 7/2017 | Per | G06F 16/11 |

* cited by examiner

CREATING A FULL BACKUP IMAGE FROM INCREMENTAL BACKUPS

BACKGROUND

The present disclosure generally relates to creating a backup copy of data contained on a data storage volume. In particular, this disclosure relates to creating, from only a plurality of incremental data backups and without need for a full backup image, a complete backup copy of data stored on the data storage volume.

Data stored within a computer, server or other electronic system can be volatile, and therefore subject to loss due to causes including, but not limited to, hard drive failures, power system failures and malware such as trojans and viruses. The loss of electronically stored data may result in downtime of an electronic system such as a computer or server, and the time required to restore/recover lost data may result in loss of system availability and/or revenues generated through the use of the system. In certain cases, if data is not backed up, the regeneration of data may take an unacceptably long time, and in certain cases lost data may be irretrievable.

A process of backing up electronically stored data can include the copying and archiving of data stored on a computer or other electronic system so it may be restored to the system after a data loss event. Current backup copies of electronic data may facilitate recovery of the data in a timely fashion, and may also ensure that the data is not irretrievably lost. In certain applications, data backups may be regularly scheduled and/or automated, and may be supplemented by manually initiated backups. Manually initiated backups may be useful, for example, during or after the completion of a significant amount of data entry or other manual tasks performed on a computer system, or after execution of a batch process. To ensure the safety and security of backed-up data, the media used to contain the data, such as a hard disk drive or magnetic tape, may be stored in an "off-site" location that is physically secure and remote from the electronic system.

SUMMARY

Embodiments may be directed towards a method of creating a backup copy of data located on a data storage volume. The method can include creating a bitmap that includes a set of indicator locations configured to contain a set of indicators, with each indicator location of the set of indicator locations representing a corresponding portion of the storage volume. The set of indicator locations is created as depopulated. The method can also include identifying portions of the storage volume that have been backed up to corresponding incremental backups of a set of incremental backups and creating, in the bitmap, until the set of indicator locations in the bitmap is fully populated, indicators of the set of indicators. The indicators can provide correspondence between the identified portions of the storage volume and the incremental backups of the set of incremental backups. The method can also include copying, to the backup copy, in accordance with the set of indicators, data from the set of incremental backups corresponding to the identified portions of the storage volume.

Embodiments may also be directed towards an electronic system. The electronic system can include a storage volume containing electronic data and a host system including at least one processor circuit. The at least one processor circuit can be configured to create a bitmap that includes a set of indicator locations configured to contain a set of indicators, each indicator location of the set of indicator locations representing a corresponding portion of the storage volume. The set of indicator locations is created as depopulated. The at least one processor circuit can also be configured to identify portions of the storage volume that have been backed up to corresponding incremental backups of a set of incremental backups. The at least one processor circuit can also be configured to create, in the bitmap, until the set of indicator locations in the bitmap is fully populated, indicators of the set of indicators, the indicators providing correspondence between the identified portions of the storage volume and the incremental backups of the set of incremental backups. The at least one processor circuit can also be configured to copy, to the backup copy, in accordance with the set of indicators, data from the set of incremental backups corresponding to the identified portions of the storage volume.

Embodiments may also be directed towards a computer program product for creating a backup copy of data located on a storage volume. The computer program product can include at least one computer readable storage medium having program instructions embodied therewith, the program instructions executable by at least one computer processor circuit to cause the at least one computer processor circuit to perform a method. The method can include creating a bitmap that includes a set of indicator locations configured to contain a set of indicators, each indicator location of the set of indicator locations representing a corresponding portion of the storage volume, the set of indicator locations created as depopulated. The method can also include identifying portions of the storage volume that have been backed up to corresponding incremental backups of a set of incremental backups and creating, in the bitmap, until the set of indicator locations in the bitmap is fully populated, indicators of the set of indicators, the indicators providing correspondence between the identified portions of the storage volume and the incremental backups of the set of incremental backups. The method can also include copying, to the backup copy, in accordance with the set of indicators, data from the set of incremental backups corresponding to the identified portions of the storage volume.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
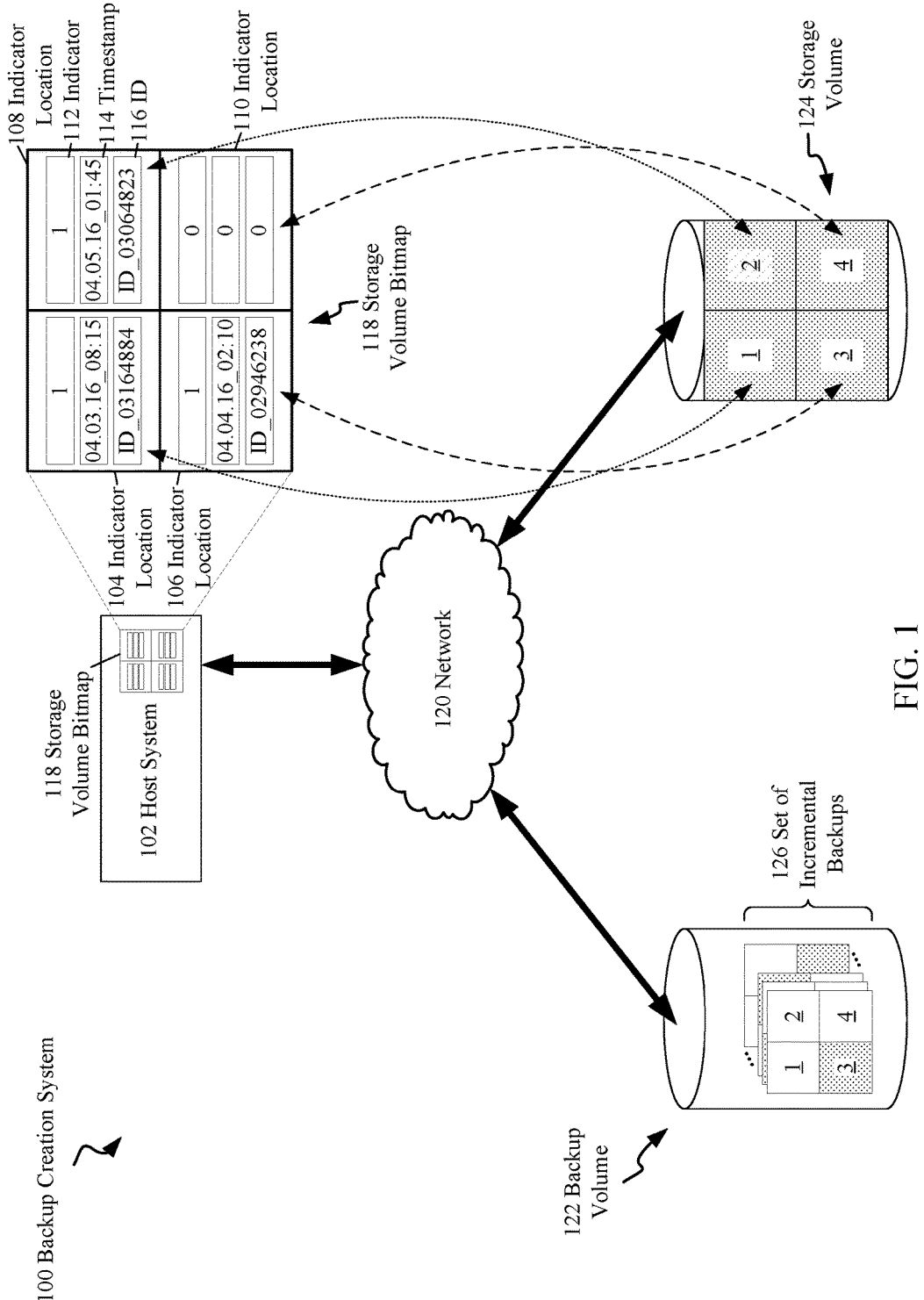
FIG. 1 depicts a system for the creation of a storage volume backup copy from a set of incremental backups, according to embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

In the drawings and the Detailed Description, like numbers generally refer to like components, parts, steps, and processes.

DETAILED DESCRIPTION

Certain embodiments of the present disclosure can be appreciated in the context of providing enhanced, robust, full backup copy creation for data stored on electronic equipment such as servers, which may be used to provide data to clients attached to a server through a network. Such servers may include, but are not limited to web servers, application servers, mail servers, and virtual servers. While not necessarily limited thereto, embodiments discussed in this context can facilitate an understanding of various aspects of the disclosure. Certain embodiments may also be directed towards other equipment and associated applications, such as providing enhanced, robust, full backup copy creation for data stored on electronic equipment such as computing systems, which may be used in a wide variety of computational and data processing applications. Such computing systems may include, but are not limited to, supercomputers, high-performance computing (HPC) systems, and other types of special-purpose computers. Embodiments may also be directed towards providing enhanced, robust, full backup copy creation for data stored on consumer and small office/home office (SOHO) electronic equipment such as personal computers, laptops, and network server devices.

For ease of discussion, the term "storage volume" is used herein to generically refer to an electronic data storage device or entity. In certain applications, a storage volume can be an entire hard disk drive, or a partition or logical unit of a hard disk drive. In some applications, a storage volume can refer to an array, or portion of an array, of hard disk drives, for example, a redundant array of independent disks (RAID) configuration, or various direct-attached storage (DAS) devices. The term "storage volume" can also be used to refer to a logical unit number (LUN), a storage area network (SAN), or at least one network-attached storage (NAS) devices.

It may be understood that the terms "incremental backup", "snapshot backup" and "snapshot" may be used interchangeably herein in reference to a partial backup of data contained on a storage volume. In certain applications, such backups may be performed in accordance with a regular schedule, and may contain only data which has changed since a previous incremental or full storage volume backup operation. It may also be understood that the terms "full backup" or "backup image" can be used to refer to a complete backup of all data contained on a particular storage volume at a particular point in time.

A data protection/backup strategy known as "block-level" backups can be used by data backup applications to create secondary copies of data stored on a computer, server or other electronic device. Performing an incremental block-level backup can involve analyzing source data, e.g., files, and subsequently backing up only the portions or blocks of data/files that have been modified following a previous backup operation. A block-level backup strategy generally bypasses the electronic device's file system and reads data directly from the disk or data storage volume. Backing up and restoring data using block-level backups can result in reduced data storage space and time requirements relative to a "file-level" or "file-centric" backup strategy.

In some applications, a "full" block-level backup copy of data stored on a storage volume can be created on a separate "backup" volume. During a full block-level backup, all of the data blocks from the data storage volume are copied to the backup volume. Once such a backup copy has been created, data on the data storage volume can be fully restored by copying data back from the backup volume to the data storage volume; no other data or backup image is required to complete such a restore operation.

In certain applications, one or more "incremental" block-level backup copies of data stored on a storage volume can be created on a separate backup volume. In an incremental block-level backup, only blocks containing data that has changed since the last full or incremental backup are copied to the backup volume. In certain applications, incremental block-level backups can be created according to a schedule or in response to contents of a data block being changed since a previous backup operation.

Once a set of incremental block-level backup copies is created, data can be restored by a backup application to the data storage volume by successively copying data blocks back from the incremental backup copies, in a reverse chronological order, until the backup application retrieves a full backup image. The backup application can then retrieve any remaining unrestored blocks from the full backup image/copy and copy them back to the data storage volume. In certain applications, an incremental block-level restore process can therefore require both an incremental backup set and a full block-level backup image/copy in order to completely restore a data storage volume.

In both the incremental and full block-level backup schemes, the presence of a full block-level backup copy of storage volume data can be critical to the process of restoring the entire contents of the data storage volume. Both the incremental and full block-level backup approaches may therefore also require the transfer of large amounts of data during the process of backing up or restoring an entire data storage volume.

If a full block-level backup image is not accessible or available, and only incremental block-level backups have been previously created, a data storage volume can be partially restored from the incremental block-level backups. This can allow the restoration of a data storage volume to an earlier time, however full data redundancy may not obtained. Therefore if any storage volume data is lost, block-level incremental backups alone may not contain sufficient data to completely restore the original data present on the data storage volume.

Backing up and restoring data to a cloud-based backup volume or to a remote volume over a network can be time-consuming, as bandwidth to cloud or network storage can be very constrained, for example, relative to SAN or DAS backup schemes. As data storage volume sizes continue to increase, backing up a storage volume to a remote location such as a cloud-based backup provider becomes more difficult and consumes greater amounts of time and network bandwidth.

Conventional block-level backup schemes do not generally obtain full redundancy of data contained in backups, and tend to limit the amount of data that can be transferred during backup and restore operations. According to embodiments of the present disclosure, a robust data backup/restore solution can leverage the advantages of both full and incremental block-level backup approaches by providing full data redundancy while limiting the network bandwidth and time requirements for block-level data backup and restore operations.

According to embodiments of the present disclosure, creation of a full block-level backup copy of storage volume data using only incremental block-level backups, without requiring a full storage volume image/copy can be useful in providing full data redundancy while limiting the time and network bandwidth requirements for data backup and restore operations. A series of block-level incremental backups of the data storage volume can be created, according to a schedule or in response to changed data written to a data storage volume. A bitmap can then be created that catalogs the incrementally backed up storage volume data blocks that are available in each of the set of snapshot backups. If at any snapshot time, the bitmap accounts for all data blocks of the storage volume, a complete storage volume copy can then be recreated or assembled by reading the snapshots, in reverse chronological order, starting from the most recent snapshot backup. Once a full storage volume copy is re-created/assembled, it can be used as a full backup image, to restore the data storage volume to its former state at the time of most recent snapshot.

Various aspects of the present disclosure may be useful for reducing the time required for a full backup image creation. Embodiments of the present disclosure can make use of limited amounts of system bandwidth for short time intervals in creating incremental/snapshot backups. A data backup system implemented according to certain embodiments may provide cost-effective data backup system for use computers and electronic devices, by using existing and proven data management, block-level data storage and networking technologies. Embodiments of the present disclosure can be useful in providing multiple restore points before a full backup image is available.

Aspects of the various embodiments may be used to enable, in a Virtual Desktop Infrastructure (VDI) environment, the restoration of partial snapshot backups onto a "golden" disk image that is not available by way of a cloud backup system. This restoration can result in significant reduction of the time required to get to a restore point. Various embodiments of the present disclosure can enable, in a collaborative development and test environment using cloud storage, very rapid point-in-time snapshots and restores of virtual machines (VMs) and raw volume data/operating system (OS) images.

Certain embodiments relate to the creation of storage volume backup images from incremental or "snapshot" backups. FIG. 1 depicts an electronic backup creation system 100 for the creation of a backup copy/image of storage volume 124 from a set of incremental backups 126. The electronic backup creation system 100 includes a host system 102, a storage volume 124 and a backup volume 122, interconnected through network 120, according to embodiments of the present disclosure. The backup creation system 100 can be useful for creating a full backup image of data stored on storage volume 124 from only a set of incremental backups 126 stored on backup volume 122, without requiring access to a full backup image of storage volume 124. Full backup images created using backup creation system 100 may require significantly less time and network bandwidth to create then backup images created using other types of backup/restore methods and systems.

According to embodiments, host system 102 may be a computer, server or other type of electronic system or device using data stored on a storage volume, e.g., storage volume 124. In some embodiments, for example, host system 102 may be a rack-mounted computer or server system, and in some embodiments host system 102 may be a special-purpose computer, supercomputer or home/office computer system. Host system 102 can be useful for providing computational and/or data serving capability to at least one client or user in accordance with functions and services offered by various types of computers, computing systems and servers.

According to embodiments, host system 102 includes a storage volume bitmap 118, which may be stored, for example in system memory or on a data storage volume, e.g., 124 of the host system 102. In embodiments, host system 102 also includes the appropriate hardware and/or software elements necessary to connect it to a wired and/or wireless data communications network, e.g., network 120. These elements may include, for example, Ethernet connection hardware and corresponding software modules.

Host system 102 can include at least one processor circuit and associated memory which can be useful in performing operations included in a method of creating a full storage volume backup image from only incremental backups. Such a method can include operations such as creating a bitmap including indicator locations representing corresponding portions of the storage volume and identifying backed up storage volume portions corresponding to the incremental backups. Operations of the method can also include writing indicators into the bitmap and copying data from the incremental backups to a re-created full backup image.

According to embodiments, network 120 is an electronic data communication network useful for transferring data between host system 102, storage volume 124 and backup volume 122. In some embodiments, storage volume 124 and backup volume 122 may be located within, or relatively close, to host system 102, in which case network 120 can be a simple point-to-point interconnection such as DAS device. In some embodiments, storage volume 124 and/or backup volume 122 may be located at a location remote to host system 102, for example, in a cloud-based storage application. In this scenario, network 120 may include network(s) such as a LAN, a SAN, a wireless fidelity (Wi-Fi) connection, a wireless local-area network (WLAN), a virtual local-area network (VLAN), and the Internet.

In embodiments, network 120 can include a wired and/or wireless connection(s), and can be implemented using a number of industry-standard networking schemes and protocols, for example Server Message Block (SMB), Transmission Control Protocol/Internet Protocol (TCP/IP), or Fibre Channel protocols. Network 120 may be configured with high-speed data communications paths in order to be useful in providing efficient data transfer and backup/restore capability between host system 102, storage volume 124 and backup volume 122.

According to embodiments, storage volume 124 is an electronic data storage volume useful for containing data accessed by host system 102. According to embodiments, the storage volume 124 can include various DAS devices, such as one or more hard disk drives, solid-state drives (SSDs), or an array of hard disk drives and/or SSDs. The storage volume 124 can also be a partition, region, or logical unit, i.e., LUN of a hard disk drive. In some embodiments the storage volume 124 can include an array, or portion of an array of hard disk drives, for example, a RAID configuration, a SAN, or at least one NAS device.

In embodiments, storage volume 124 is configured to allow "block-level" access to stored data by host system 102. Thus, host system 102 can read and write data stored within logical and/or physical portions of storage volume 124, independent of any particular file system under which files are organized. For ease of illustration and discussion herein, storage volume 124 is divided into four storage volume portions labeled 1, 2, 3 and 4. In embodiments, storage volume 124 can be divided into a large number, e.g., thousands, of portions or blocks, in accordance with the amount of data stored on storage volume 124, and the amount of data stored in each portion or block. In particular applications, a portion can be a partition, a sector, a block, a region, a volume, a LUN or a disk of a disk storage array. In certain applications, portion or block sizes may be chosen in order to optimize the speed and efficiency of block-level activities such as backup and restore operations.

According to embodiments, backup volume 122 is an electronic data storage volume useful for containing a set of incremental backups 126 which can be accessed by host system 102. According to embodiments, backup volume 122 can be similar to storage volume 124, and can include various DAS devices, such as one or more hard disk drives, SSDs, or an array of hard disk drives and/or SSDs. Backup volume 122 can also be a partition, region, or logical unit, i.e., LUN of a hard disk drive. In some embodiments the backup volume 122 can include an array, or portion of an array of hard disk drives, for example, a RAID configuration, a SAN, or at least one NAS device.

Similar to storage volume 124, backup volume 122 is configured to allow "block-level" access to data backed up by host system 102 from storage volume 124 onto backup volume 122. For ease of illustration and discussion, backup volume 122 is depicted as containing a set of incremental backups 126, each incremental backup divided into four portions 1, 2, 3 and 4. Each incremental backup of the set of incremental backups 126 can include one or more portions or blocks of data from storage volume 124 that have changed following a previous incremental/snapshot backup operation.

In embodiments, backup volume 122 can be configured to contain a large number, e.g., hundreds, of individual incremental backups, in accordance with the amount of data stored on storage volume 124, and the amount of data stored in each incremental backup. In particular applications, a block or portion of a storage volume can be a partition, a sector, a region, a volume, a LUN or a disk of a disk storage array. In applications, portion or block sizes within incremental backups may generally match the size of data blocks or portions of storage volume 124. In certain applications, backup volume 122 and storage volume 124 may be different physical devices, e.g., hard disk drives, and may be situated in different locations, in order to reduce risk of data loss from events such as hardware failures, electrical events, fires, earthquakes, and/or malicious activity.

According to embodiments, host system 102 contains a bitmap 118 that includes a set of indicator locations 104, 108, 106 and 110, which are useful to contain a set of indicators of the backup statuses of corresponding portions 1, 2, 3 and 4 of storage volume 124, respectively. According to embodiments, each portion or block of a storage volume has a corresponding indicator location in a bitmap within the host system, regardless of the number of portions or blocks contained in a storage volume.

The indicator locations, e.g., 104, 108, 106 and 110 are each configured to contain various types of status information useful to host system 102 in establishing a correspondence between a portion of storage volume 124 and one or more incremental backups of the set of incremental backups 126. For example, indicator location 108 contains indicator 112, set to a binary "1" value, indicating that an incremental backup exists, within the set of incremental backups 126, that contains a copy of corresponding portion "2" of storage volume 124. Similarly, if indicator 112 contains a "0", this indicates that an incremental backup does not exist for corresponding portion "2" of storage volume 124.

Indicator location 108 also contains timestamp 114, which contains information indicating a date and/or time when a most recent incremental backup of the corresponding portion "2" of the storage volume 124 was created. Information within timestamp 114 can be compared by host system 102 to creation dates of other incremental backups of the set of incremental backups 126 in order to determine which incremental backup of a portion of storage volume 124 was created most recently. In some embodiments, each incremental backup includes an associated timestamp with a unique time/date value, i.e., each incremental backup is taken at a different time. According to embodiments, host system 102 can be configured to write a timestamp value into an indicator location, e.g., 108, at the time of creation of the corresponding incremental backup. In some embodiments host system 102 can be configured to write a timestamp value into an indicator location in response to a search, through a set of incremental backups 126, for the most recently created incremental backup of a particular portion of the storage volume 124. In embodiments, timestamp 114 can have a variety of date/time formats.

Indicator location 108 also contains ID 116, which contains information such as a serial number or series of alphanumeric digits corresponding to a particular incremental backup of the set of incremental backups 126. ID 116 can be useful in uniquely identifying a particular incremental backup containing a copy of portion "2" of storage volume 124 from other backups within the set of incremental backups 126. Identifying information within ID 116 can be read by host system 102 as a pointer or reference in order to tag, locate and/or retrieve a particular incremental backup from the set of incremental backups 126. Such a pointer or reference can be useful when copying backup portions from the set of incremental backups 126 to a full backup copy of the storage volume. According to embodiments, each incremental backup can have an associated ID that is unique, in order to facilitate incremental backup indexing and retrieval.

According to embodiments, host system 102 can be configured to write an ID value into an indicator location, e.g., 116, at the time of the corresponding incremental backup creation. In some embodiments host system 102 can be configured to write an ID value into an indicator location in response to a search, through a set of incremental backups 126, for an incremental backup of a particular portion of the storage volume 124. In embodiments, ID 116 can have a variety of numeric and/or alphanumeric formats.

In the discussion above, certain examples of indicators, e.g., 112, timestamps e.g., 114, and IDs, e.g., 116 have been discussed, however, these indicator examples are not limiting. According to the spirit and scope of the present disclosure, other types and formats of backup status information may be included within each indicator location of the storage volume bitmap 118.

According to embodiments, host system 102 creates storage volume bitmap 118 as initially "depopulated" or "empty" of any indicators such as indicator 112, timestamp 114 and ID 116. In embodiments, indicator locations may be initially populated, upon creation, with "null" or "0" values, and such a bitmap may still be considered "depopulated" as the term is used with this disclosure. As incremental backups are created and/or searched for, storage volume bitmap 118 is populated in response to a particular incremental backup being either created or found in the set of incremental backups 126. According to embodiments, host system 102 is configured to create storage volume bitmap 118 within memory or data storage areas, e.g., on a hard disk, of host system 102. In embodiments, the storage volume bitmap 118 can be a table, database, text file, memory device or other software or hardware data container within a host system 102 that is useful for containing an array or collection of data corresponding to the backup status of portions of storage volume 124.

Figure 2:
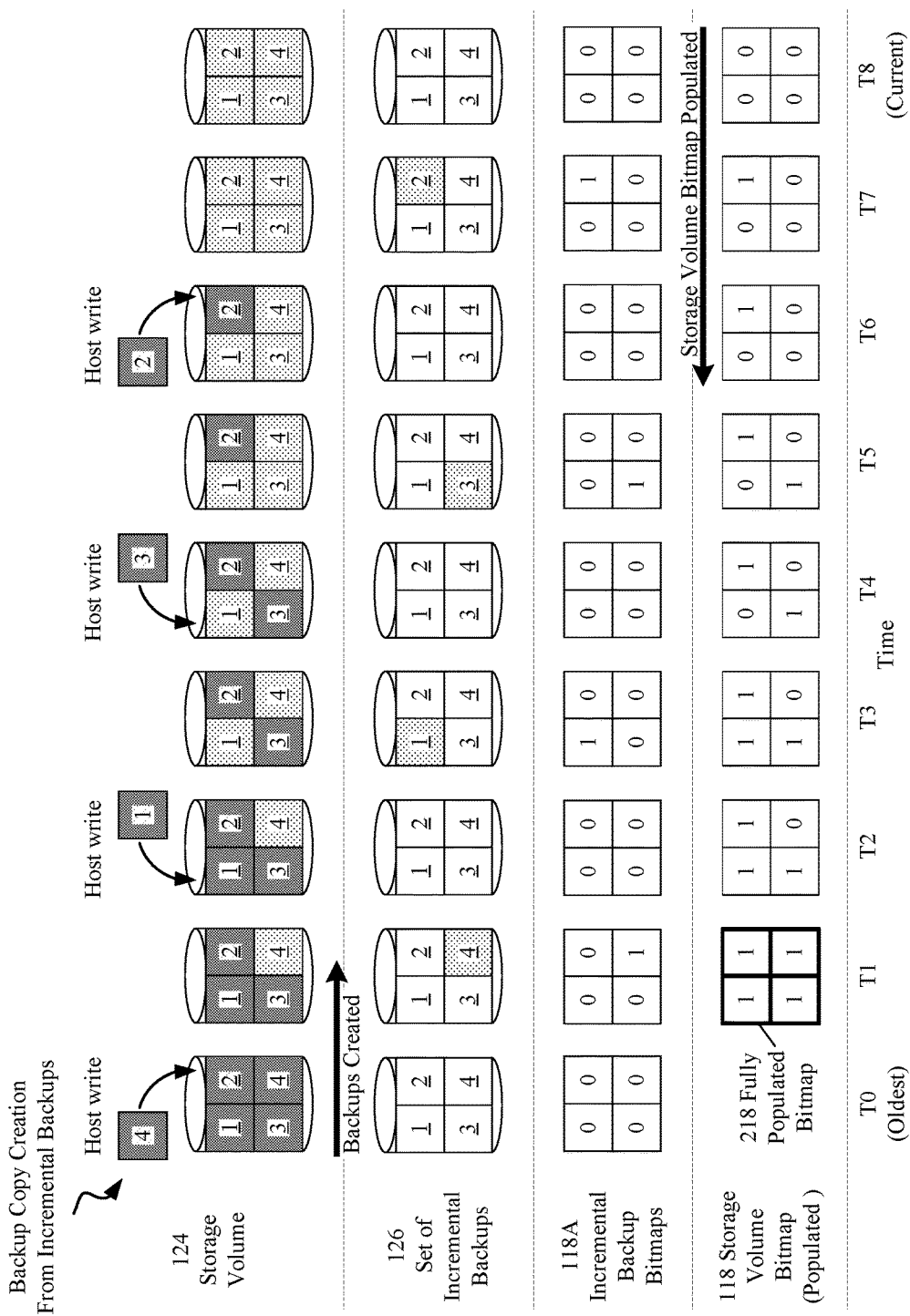
FIG. 2 depicts the results of a series of operations included in the creation of a storage volume backup copy from a set of incremental backups, according to embodiments consistent with the figures.

FIG. 2 depicts the results of an example series of operations included in the creation of a storage volume 124 backup copy from a set of incremental backups 126, according to embodiments consistent with the figures. FIG. 2 may be useful in facilitating an understanding of the creation of a set of incremental backups 126 in response to changing data on storage volume 124, the creation of incremental backup bitmap 118A, and the creation of a storage volume bitmap 118. The creation of incremental backups and cataloging of these backups through creation of incremental backup and storage volume bitmaps can allow a full backup image of the contents of a storage volume to be created efficiently, using less time and bandwidth than other backup and restore methods. According to embodiments, a previously created storage volume full backup image is not used nor required in order to restore the data contents of the storage volume.

FIG. 2 depicts an example of how the contents of a storage volume 124, set of incremental backups 126, an incremental backup bitmap 118A and a storage volume bitmap 118 may change over a sequential set of times T0-T8. The depicted time-related changes are useful in illustrating how incremental backups may be created, read and catalogued or indexed in a bitmap or similar data structure, and subsequently used to create or reconstruct a backup copy of data on a storage volume, e.g., storage volume 124.

The times T0 to T8, along the horizontal axis of FIG. 2, are used to represent an ordered sequence of times corresponding to incremental backup operations. Time T8 is used to represent a "current" or most recent time corresponding to the most recent/current incremental backup. Time T0 is used to represent the time of the "oldest" incremental backup required to create a full backup of storage volume 124. Although incremental backups and results of other operations can exist before time T0, incremental backups taken before time T0 are not required for the creation of a storage volume full backup image. Depicted times T0 to T8 represent only the window of time encompassing incremental backups and other operations necessary for the creation of a storage volume full backup image.

In some embodiments, incremental or snapshot backups are taken at regularly scheduled times. In some embodiments, incremental backups are taken in response to changes in data on storage volume 124, or other criteria, and the resulting time intervals between adjacent times, e.g., T0 to T1 and T1 to T2 may not be identical. In general, the storage volume 124 row and the set of incremental backups 126 row of FIG. 2 may be understood in a "forward-looking" direction, i.e., in a time-ordered sequence from time T0 to T8. Storage volume 124 data is changed and in response the set of incremental backups 126 is created in an "oldest" to "newest" sequence from time T0 to T8.

Similarly, the creation of an incremental backup bitmap 118A may be understood in a "forward-looking" direction from time T0 to T8, in direct response to the creation of each backup of the set of incremental backups 126. The creation of incremental backup bitmap 118A may also be understood in a "backward-looking" direction from time T8 to T0. In some embodiments, the incremental backup bitmap 118A may alternatively be created by a host system searching the set of incremental backups 126 in a "reverse" order, i.e., from time T8 to T0, and subsequently creating the incremental backup bitmaps 118A.

The creation of storage volume backup bitmap 118 may also be understood in a "backward-looking" direction from time T8 to T0. According to embodiments, the incremental backup bitmap 118A may be created by the host system reading the incremental backup bitmaps 118A in a "reverse" order, i.e., from time T8 to T0, and subsequently populating indicator locations within the storage volume backup bitmap 118.

For ease of discussion of FIG. 2, only a binary indicator, consistent with indicator 112, FIG. 1 will be referenced. It may be understood however, according to embodiments, indicators such as timestamp 114, FIG. 1, ID 116, FIG. 1, or other types of indicators can also be used within the incremental backup bitmap 118A and storage volume bitmap 118.

For purposes of illustration, the storage volume 124 is divided into four storage volume portions 1-4, consistent with the figures. The storage volume 124 row of FIG. 2 is useful in representing, over the times T0 to T8, how the contents of portions of storage volume 124 can change, in response to data written to them from a host system. For example, at time T0, storage volume 124 portion 4 is depicted as receiving new or changed data written from a host system. This operation may be referred to as a "host write". A host write occurs when a host system such as a computer, server or other electronic device, writes new or changed data into one or more portions of a data storage volume, for example during the course of the host system performing operations such as processing data or serving files. Host writes of portions 1, 3 and 2 of storage volume 124 occur at times T2, T4 and T6, respectively.

The darker shading of certain portions of storage volume 124 denotes storage volume portions that, at particular times, are not yet backed up in the set of incremental backups 126. For example, at time T0, storage volume 124 portions 1-4 are all darkly shaded, indicating that none of portions 1-4 have yet been included in the set of incremental backups 126. As data is backed up from storage volume 124 portions to the set of incremental backups 126, the shading of the backed up portion(s) is changed from dark to light to denote that these portion(s) are included in the set of incremental backups 126. For example, at time T1, portion 4 of storage volume 124 is slightly shaded, indicating that portion 4 has been included in the set of incremental backups 126.

As time progresses from time T0 to time T8, storage volume 124 receives new data, from the host system, in portions 4, 1, 3 and 2, at times T0, T2, T4 and T6, respectively. As these newly changed storage volume portions are incrementally backed up, the shading representing backed up portions is changed from dark to light. The shading therefore indicates that at times T7 and T8, all of the most recent changes to portions of storage volume 124 have been included in the set of incremental backups 126. Starting at time T8, therefore, a complete set of the most recently changed portions of storage volume 124 is available for inclusion in a storage volume full backup image.

For purposes of illustration, each incremental backup of the set of incremental backups 126 is divided into four storage volume portions 1-4, consistent with the figures. The set of incremental backups 126 row of FIG. 2 is useful in representing the contents of individual incremental backups taken at particular points in time. According to embodiments, these backups are created, by the host system, in response to new or changed data being written into portions of storage volume 124.

For example, at time T0, portion 4 of storage volume 124 receives data written from the host system. In response, at time T1, the host system incrementally backs up portion 4 of storage volume 124 to an incremental backup within the set of incremental backups 126. The presence of a particular portion within an incremental backup is denoted by the portion, e.g., portion 4 at time T1, being lightly shaded. The absence of shading of any portion of an incremental backup indicates that the corresponding portion of the storage volume 124 is not included in that particular incremental backup. Each incremental backup of the set of incremental backups 126 includes only data that has changed since the previous incremental backup.

As time progresses from time T0 to time T8, storage volume 124 portions 4, 1, 3 and 2 receive changed or new data from the host system, and are subsequently backed up to the set of incremental backups 126, as represented by the shaded incremental backup portions at times T1, T3, T5 and T7, respectively. When the backup of all of the portions of storage volume 124 has been completed, at time T8, the set of incremental backups 126 is complete and ready to be used to construct a full backup image of storage volume 124. Each time portion of storage volume 124 is changed a new incremental backup is subsequently taken. According to embodiments, the newest incremental backup containing a particular portion will be used in reconstructing a storage volume full backup copy.

Similar to the set of incremental backups 126, each incremental backup bitmap of the set 118A is divided into four storage volume portions 1-4, consistent with the figures. The incremental backup bitmap 118A row of FIG. 2 is useful in representing the presence of individual portions of the storage volume 124 in particular incremental backups.

For example, at time T1, an incremental backup of portion 4 of storage volume 124 is created by the host system. The corresponding incremental backup bitmap includes a binary "1" value in the position corresponding to portion 4 of the incremental backup. Each time a storage volume 124 portion is incrementally backed up, a corresponding incremental backup bitmap is created for use by the host system. The incremental backup bitmap 118A row represents an "instantaneous" record of the incremental backup of portions of the storage volume 124 portions at particular times.

For simplicity of illustration, a binary "1" value is used in the incremental backup bitmaps to denote the presence of a particular storage volume portion, however other indicator values within the bitmap may also be used, such as a unique ID, serial number, timestamp, or other type(s) of indicators, consistent with the figures. In some embodiments, incremental backup bitmaps 118A can be created by the host system in a "forward" direction, i.e., in order from time T0 to time T8, as incremental backups are created. In some embodiments, incremental backup bitmaps 118A can be created in a "backward" direction, i.e., in order from time T8 to time T0, as the host system reads the set of incremental backups 126 after they are created.

Similar to the incremental backup bitmaps 118A, the storage volume bitmap 118 is divided into four storage volume portions 1-4, consistent with the figures. The storage volume bitmap 118 row of FIG. 2 is useful in representing the presence of backups of individual portions of the storage volume 124 within the entire set of incremental backups 126. For simplicity of illustration, a binary "1" value is used in the storage volume bitmap 118 to denote the presence of a particular storage volume portion within the entire set of incremental backups 126. However other indicator values within the bitmap may also be used, such as a unique ID, serial number, timestamp, or other type(s) of indicators, consistent with the figures.

According to embodiments, storage volume bitmap 118 is created by the host system in a "backward" direction, i.e., in order from time T8 to time T0, as the host system reads the incremental backup bitmaps 118A after they are created, and adds indicators found in incremental backup bitmaps 118A to storage volume bitmap 118. The storage volume bitmap 118 row therefore represents a "cumulative" record of the incremental backups of the storage volume 124 portions at particular times. The host system adds indicators found in incremental backup bitmaps 118A to storage volume bitmap 118 until the set of indicator locations in storage volume bitmap 118 is fully populated. Once fully populated, the storage volume bitmap 118, as depicted in fully populated bitmap 218, indicates that a full storage volume backup copy can now be constructed by reading and accumulating all the incremental backups backwards from time T8 to time T0.

Following the complete population of storage volume bitmap 118, the full backup image of storage volume 124 is created by the host system copying data portions from the set of incremental backups 126 into a full backup image. The copying ceases when all portions of the storage volume 124 are restored, in accordance with storage volume bitmap 118 and incremental backup bitmaps 118A. The operations described herein use the most recent incremental backup of each portion of the storage volume, and therefore preserve the integrity of the data stored on storage volume 124. Thus, the backup copy is created from incremental backups without requiring a prior full backup copy of the storage volume, and can be used to restore the storage volume 124 to a previous state.

For simplicity of illustration and discussion, the above-described series of operations included in the creation of a storage volume 124 backup copy from a set of incremental backups 126 includes only one host write per storage volume 124 portion. However, other host write sequences may be possible, for example sequences having multiple sequential host writes to a particular storage volume 124 portion. For example, a certain host write sequence could include host writes to storage volume 124 portions 3, 4, 4, 2, 1, in chronological order. In such an example, only the most recent host write to portion 4 would be included in the bitmap, while the earlier host write to portion 4 would be ignored. Ignoring the earlier host write to portion 4 could have certain advantages in not requiring copying or transmitting of the earlier incremental backup of portion 4 when creating the full backup copy of storage volume 124.

Figure 3:
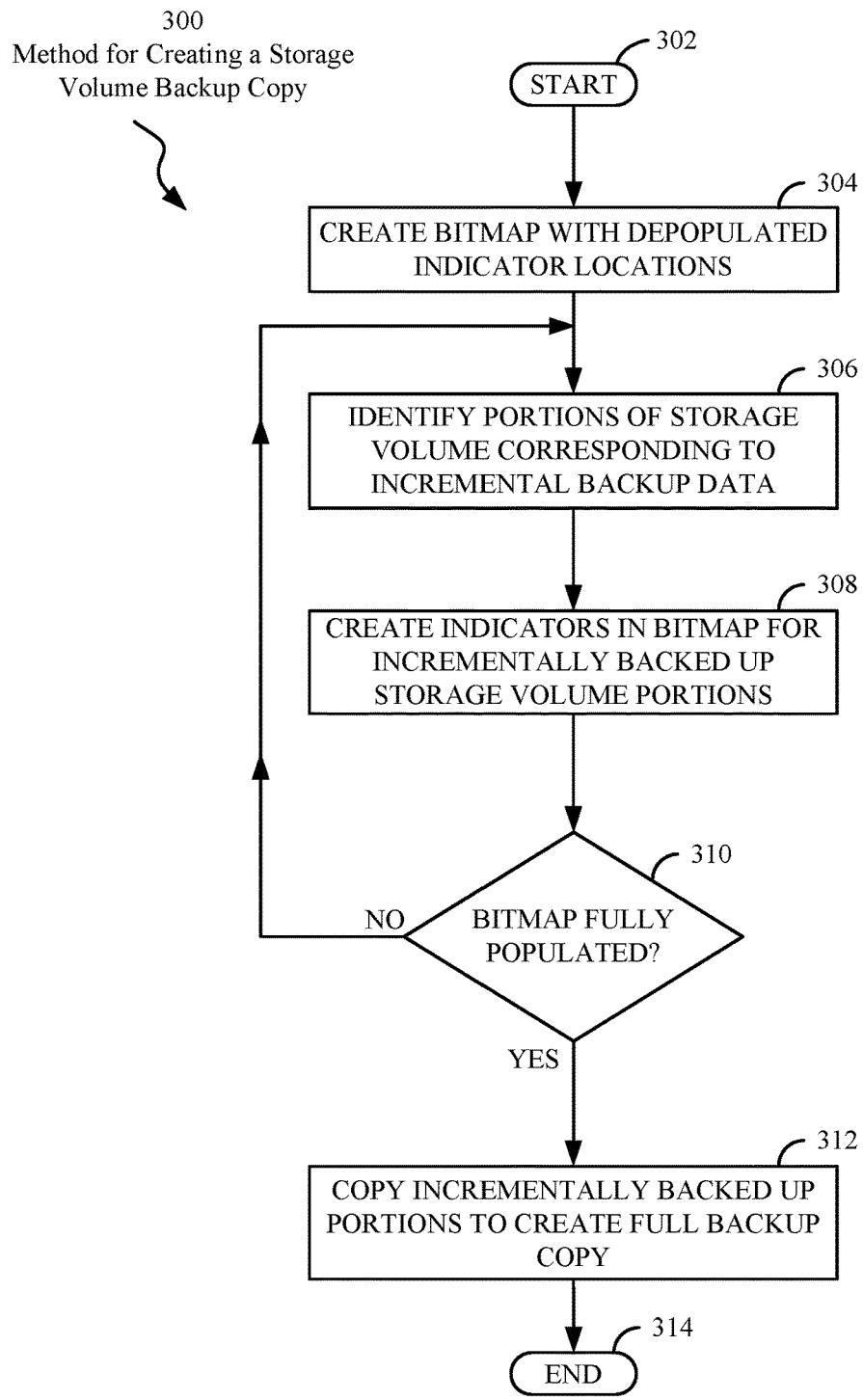
FIG. 3 is a flow diagram depicting a method of creating a storage volume backup copy from a set of incremental backups, according to embodiments consistent with the figures.

FIG. 3 is a flow diagram depicting a method of creating a storage volume backup copy 300 from a set of incremental backups, according to embodiments consistent with the figures. The process 300 moves from start 302 to operation 304. Operation 304 generally refers to creating a bitmap with a set of depopulated indicator locations. In embodiments, a host system is used to create a bitmap including indicator locations corresponding to portions of a storage volume. The indicator locations are initially created in a "depopulated" state, having a binary "0" or some other null value indicator in each location, the indicator signifying an absence of a backup for the corresponding portion of the storage volume. The bitmap may be created within memory or a data storage device, e.g., a hard disk drive within the host system. Once the bitmap is created, the process moves to operation 306.

Operation 306 generally refers to identifying portions of the storage volume that correspond to data in incremental backups. In some embodiments, the host system can identify, during the creation of incremental block-level backups of the storage volume, which portions of the storage volume include data changed since a previous incremental backup, and are to be included in the current incremental backup. Once portions of storage volume are identified, the process moves to operation 308.

Operation 308 generally refers to creating indicators in the bitmap corresponding to incrementally backed up portions of the storage volume. According to embodiments, the host system creates indicators, within the bitmap, corresponding to backed up portions of the storage volume identified in operation 306. Such indicators can include binary values, timestamps, ID text strings, or other useful and/or unique identifiers that are useful to create correspondence between particular incremental backups and portions of the storage volume included in the incremental backups. Once indicators are created, the process moves to operation 310.

At operation 310, a determination is made between regarding whether the bitmap is fully populated or not. In embodiments, the host system is used to determine whether the bitmap is fully populated, i.e., whether a positive indication of an incremental backup of each portion of the storage volume is present. The host system is configured to read each indicator within the bitmap, and determine if any of the indicators remain in a "depopulated" state, e.g., a binary "0" or some other null value indicator. If any of the indicators remain depopulated, then the incremental backup(s) of the corresponding portion(s) of the storage volume are absent, and creating a full backup image of the storage volume will fail. If all of the indicators are populated, then the incremental backups of all portions of the storage volume are present, and creating a full backup image of the storage volume can complete successfully. If it is determined that the bitmap is not fully populated, the process returns to operation 306. If it is determined that that the bitmap is fully populated, the process moves to operation 312.

Operation 312 generally refers to copying incrementally backed up portions of the storage volume to create a full backup copy or image. According to embodiments, the bitmap being fully populated, as determined in operation 310, indicates the presence of incremental backups of each and every portion of the storage volume. Once a complete set of incremental backups of the storage volume is present, the host system is used to reassemble/copy these incremental backups and to a complete and full backup image for the storage volume. Once incrementally backed up portions of the storage volume are copied, the process 300 may end at block 314.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
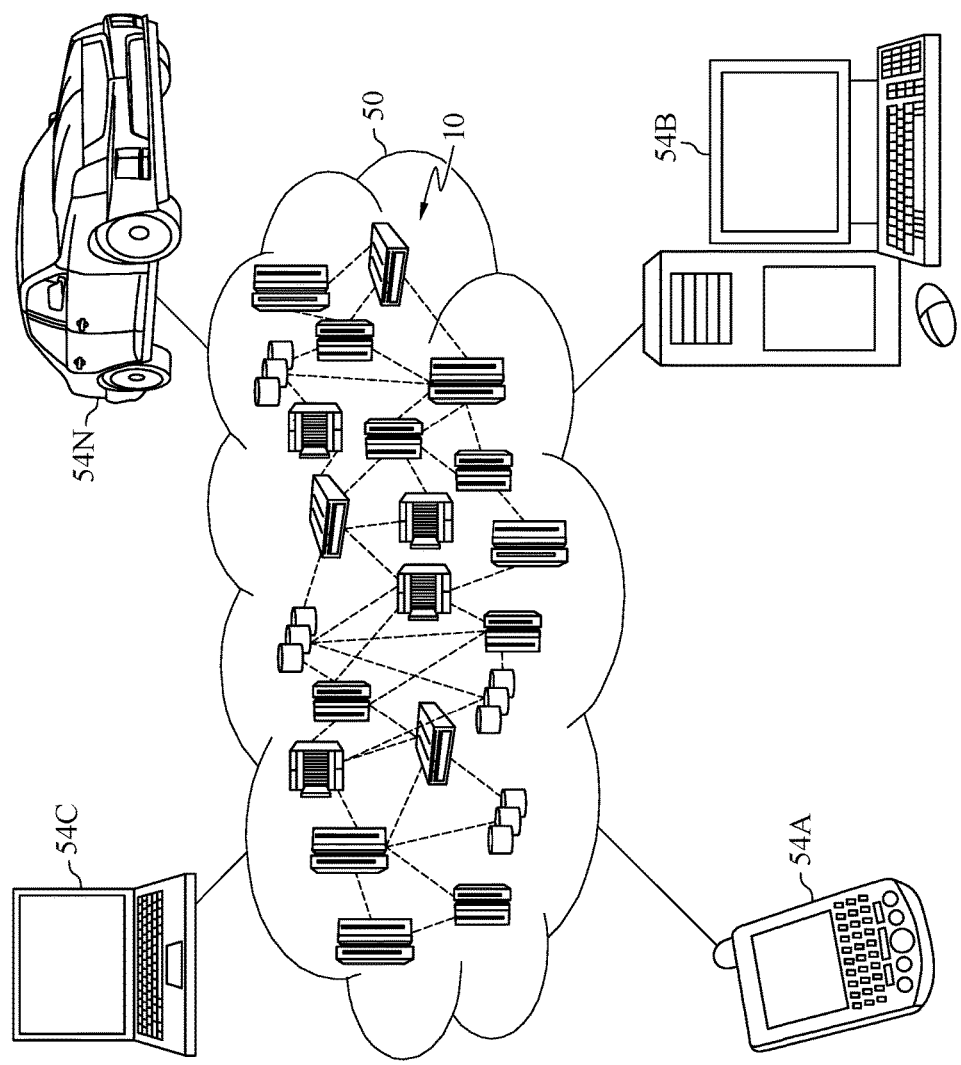
FIG. 4 depicts a cloud computing environment according to embodiments consistent with the figures.

Referring now to FIG. 4, illustrative cloud computing environment 50 is depicted. As shown, cloud computing environment 50 includes at least one cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in at least one networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
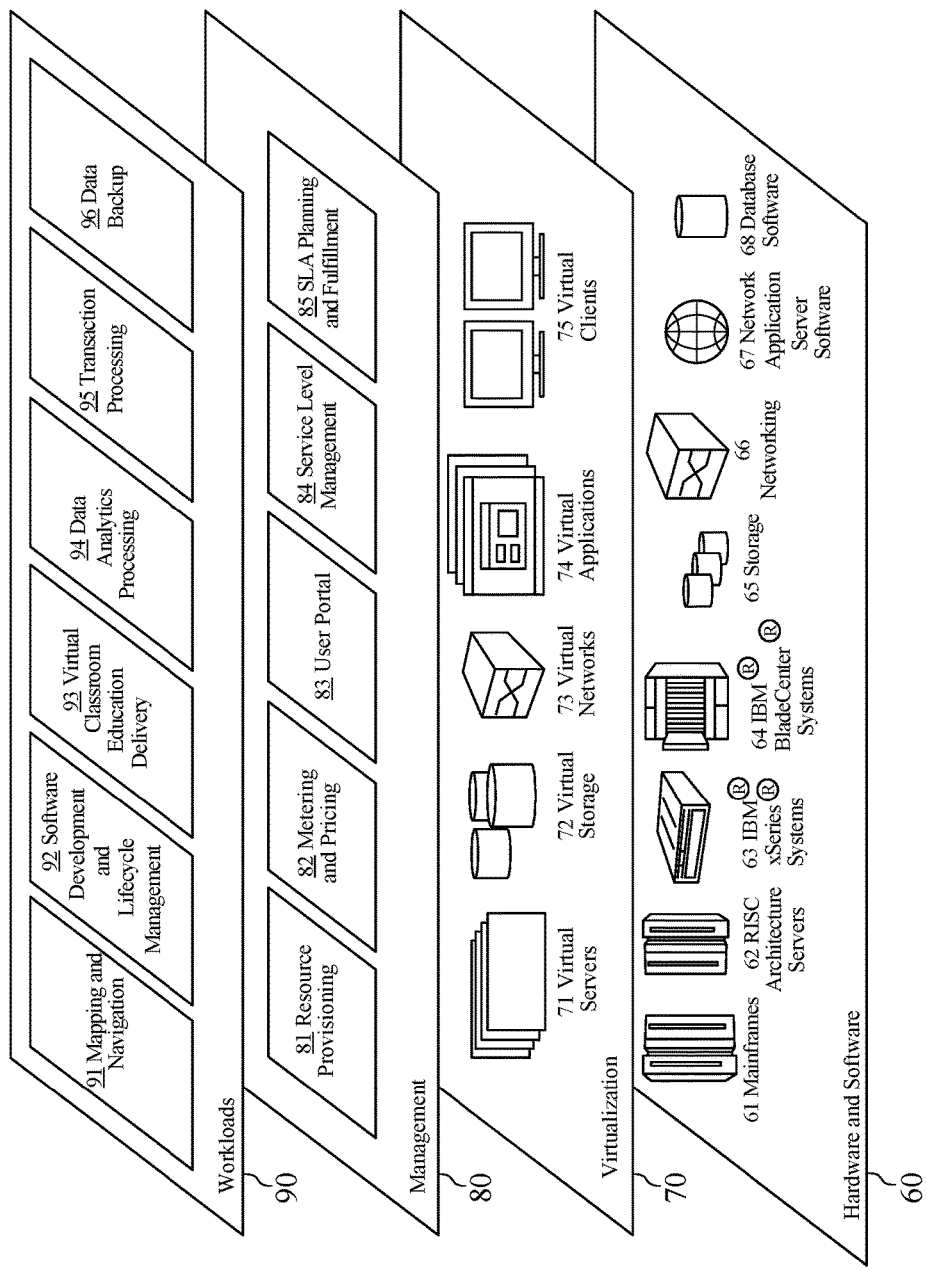
FIG. 5 depicts abstraction model layers according to embodiments consistent with the figures.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data backup 96.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of at least one programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises at least one executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of creating a backup copy of data located on a storage volume of an electronic system, the method comprising:
    creating, with at least one processor circuit connected to an associated memory of a host system, a bitmap that includes a set of indicator locations configured to contain a set of indicators, each indicator location of the set of indicator locations representing a corresponding portion of the storage volume, the set of indicator locations created as depopulated;
    identifying, with the at least one processor circuit, portions of the storage volume that have been backed up to corresponding incremental backups of a set of incremental backups;
    creating, with the at least one processor circuit, in the bitmap, until the set of indicator locations in the bitmap is fully populated, indicators of the set of indicators, the indicators providing correspondence between the identified portions of the storage volume and the incremental backups of the set of incremental backups, the indicators corresponding to a subset of incremental backups that is smaller than the set of incremental backups, the indicators being created in a reverse chronological order from a time corresponding to a most recent incremental backup to a time corresponding to an earlier incremental backup; and
    copying, with the at least one processor circuit, to the backup copy, in accordance with the set of indicators, data from the set of incremental backups corresponding to the identified portions of the storage volume.

2. The method of claim 1, wherein the backup copy is created from incremental backups without using of a prior full backup copy of the storage volume.

3. The method of claim 1, wherein creating the bitmap includes creating a set of empty indicator locations.

4. The method of claim 1, wherein creating an indicator of the set of indicators includes writing a bit into an indicator location.

5. The method of claim 1, wherein creating an indicator of the set of indicators includes writing, into an indicator location, information that uniquely identifies an incremental backup of the set of incremental backups.

6. The method of claim 1, wherein creating an indicator of the set of indicators includes writing, into an indicator location, timestamp information corresponding to a creation date and time of an incremental backup.

7. The method of claim 6, wherein the timestamp information corresponding to a creation date and time of an incremental backup is different than timestamp information corresponding to a creation date and time of other incremental backups of the set of incremental backups.

8. The method of claim 6, wherein each indicator of the set of indicators contains unique timestamp information.

9. An electronic system comprising:
a storage volume containing electronic data; and
a host system including at least one processor circuit connected to an associated memory, the host system configured to:
create, with the at least one processor circuit, a bitmap that includes a set of indicator locations configured to contain a set of indicators, each indicator location of the set of indicator locations representing a corresponding portion of the storage volume, the set of indicator locations created as depopulated;
identify, with the at least one processor circuit, portions of the storage volume that have been backed up to corresponding incremental backups of a set of incremental backups;
create, with the at least one processor circuit, in the bitmap, until the set of indicator locations in the bitmap is fully populated, indicators of the set of indicators, the indicators providing correspondence between the identified portions of the storage volume and the incremental backups of the set of incremental backups, the indicators corresponding to a subset of incremental backups that is smaller than the set of incremental backups, the indicators being created in a reverse chronological order from a time corresponding to a most recent incremental backup to a corresponding to an earlier incremental backup; and
copy, with the at least one processor circuit, to a backup copy, in accordance with the set of indicators, data from the set of incremental backups corresponding to the identified portions of the storage volume.

10. The electronic system of claim 9, wherein the storage volume is selected from the group consisting of: a logical unit number (LUN), a hard disk drive, an array of hard disk drives and a solid-state drive (SSD).

11. The electronic system of claim 9, wherein portions of the storage volume are selected from the group consisting of: a partition, a block, a region, a volume, a logical unit number (LUN) and a disk of a disk storage array.

12. The electronic system of claim 9, wherein the backup copy is located external to the storage volume.

13. The electronic system of claim 9, wherein the set of incremental backups is located external to the storage volume.

14. A computer program product for creating a backup copy of data located on a storage volume of an electronic system, the computer program product comprising at least one computer-readable storage medium having program instructions embodied therewith, the program instructions executable by at least one computer processor circuit of a host system, in conjunction with an associated memory, to cause the at least one computer processor circuit to:
create a bitmap that includes a set of indicator locations configured to contain a set of indicators, each indicator location of the set of indicator locations representing a corresponding portion of the storage volume, the set of indicator locations created as depopulated;
identify portions of the storage volume that have been backed up to corresponding incremental backups of a set of incremental backups;
create, in the bitmap, until the set of indicator locations in the bitmap is fully populated, indicators of the set of indicators, the indicators providing correspondence between the identified portions of the storage volume and the incremental backups of the set of incremental backups, the indicators corresponding to a subset of incremental backups that is smaller than the set of incremental backups, the indicators being created in a reverse chronological order from a time corresponding to a most recent incremental backup to a time corresponding to an earlier incremental backup; and
copy, to the backup copy, in accordance with the set of indicators, data from the set of incremental backups corresponding to the identified portions of the storage volume.

15. The computer program product of claim 14, wherein each incremental backup of the set of incremental backups includes at least one portion of the storage volume, the at least one portion containing data that has changed since creation of a previous incremental backup.

16. The computer program product of claim 14, wherein an indicator is created in the bitmap in conjunction with creating an incremental backup.

* * * * *